March 17, 1942. LE ROY W. HAHN 2,276,483
LOADER-STACKER
Filed July 23, 1940 5 Sheets-Sheet 1

Fig. I.

Inventor
LeRoy W. Hahn
By Mawhinney & Mawhinney
Attorneys.

Patented Mar. 17, 1942

2,276,483

UNITED STATES PATENT OFFICE 2,276,483

LOADER-STACKER

Le Roy W. Hahn, Algona, Iowa

Application July 23, 1940, Serial No. 347,003

12 Claims. (Cl. 214—139)

The present invention relates to new and useful improvements in a tractor operated loader and stacker and particularly useful for gathering hay and swathed grain of all kinds from shocks or windrows, lift it off the ground and carry it to the stack or place it on a vehicle. The invention is also adapted for picking up shocked grain or bunched alfalfa cut for seed, and loading it into vehicles or delivering it directly to the threshers.

It is an object of the present invention to produce a machine of the character described that is highly efficient in operation, reliable in such operation and inexpensive to manufacture.

Another object of the present invention is a machine of the character described that is easily attached to a tractor and particularly to a row crop tractor.

A further object of the invention is a machine of the character described having improved means for elevating the load implement.

A still further object of the invention is to provide a machine of the character described having novel means for tilting the load implement in load discharging position.

A still further object of the invention is to provide a machine which permits the load to be lifted at a great height without having tall track members projecting from the machine.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, the loader stacker is supported on a frame which may include a pair of spaced side members 1 braced at intervals by bars 2 and 2' and crossed rods 3. The spaced side members 1 are bridged at their outer portions by front and rear cross members 4 and 5 to which the side members 1 are suitably secured, as shown at 6 and 6', to form a frame. Outside the side members 1, and spaced therefrom by the brace bars 2 and 2', to which they are bolted as shown at 7, are a pair of track rails 8 which are suitably bolted to the front cross member 4 only, the rear portions of the track rails being free. Further bracing rods 9 are bolted to member 4 and extend between the spaced beams 1 to which they are bolted as shown at 10 to form a rigid construction.

The front cross member 4 extends beyond the side members 1 and track rails 8 and has mounted at the extended ends for rotative movement a pair of caster wheels 11 supporting brackets 12. The rear support for the machine is formed by the rear wheels of a conventional tractor to which the loader-stacker is attached. The drawings do not show a complete tractor but only the rear wheels 13, the front of the tractor being disposed within the framework described. The rear cross member 5 is suitably bolted to the axle 14, as shown at 14', to hold the rear portion of the framework in raised position substantially equal to the raised position of the front portion whereby the loader-stacker may be driven about on wheels 11 and 13.

The elevating construction by which the load is raised comprises curved upright lifting track rails 15 and a carriage formed of members 16 and 16' adapted to travel longitudinally with respect to the track rails 8 and upright tracks 15. As shown in the drawings the track members 15 have the curved portions of their lower ends 17 resting on and supported by the track rails 8 and braced thereto by means of plates 18 bolted to the ends 17 and rails 8. The tracks 15 curve gradually forward and upward for a distance and then assume a forwardly inclined position, as indicated at 19, the upper ends of which are closed by flanged caps 20. Bracing means for the upper ends of the tracks 15 comprise channel members 21 secured at their upper ends to the flange caps 20 by means of bolts 22 and nuts 23 which secures the caps and channel members 21 to the tracks 15. The lower ends of channel members 21 are bolted to the front cross member 4 to be rigidly supported and are braced by rods 23' bolted to the tracks 15 through the channel members 21 and also to cross member 4.

The load implement and tripping mechanism for same are carried by the carriage 16 and 16' which extends beyond the cross member 4 for this purpose. The carriage is provided with depending guide members 28 suitably braced by rods 29 which are bolted to the members 28 and 16'. The rake or other implement 30 includes a back portion 31 which has secured thereto complemental guides 32 in alinement with the guide members 28 and adapted to be received therein when the carrier is in loading position.

The guides 32 of the implement are pivotally secured at their lower portions within the guide members 28 by means of bolts 33 passing through the guides 28 and members 32. The bolts 33 in addition to serving to connect members 28 and 32 together also secure the brace rods 29 and 34 to the members 28, the other ends of rods 34 being bolted to cross piece 16'. Further bracing rods 35 extend from the implement 30 to the upper portions of the guides 32. To the upper portions of guides 32 are pivotally secured clevises 36 to which are connected cables 37 for a purpose to be described later.

Figure 5:
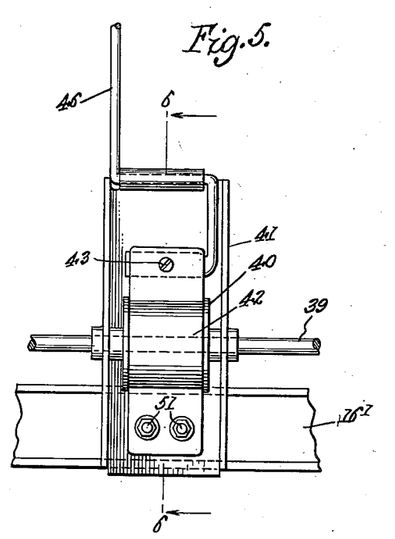
Figure 5 is a front elevational view of the brake mechanism for the tilting implement.
Figure 6:
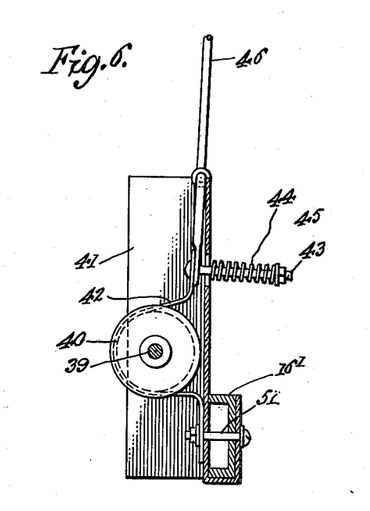
Figure 6 is a sectional view of the same taken along lines 6—6 of Figure 5.

Transversely of the carriage beams 16 and 16' and journaled in bearings 38 is a rotatable shaft 39 which carries the tripping mechanism shown in detail in Figures 5 and 6. This mechanism includes a friction brake drum 40 rigidly secured to the shaft 39 and rotatable therewith, a U-shaped housing 41 for the brake drum 40, a brake band 42 for the brake drum 40, a threaded bolt 43 extending through the band 42 and the back portion of housing 41 and carrying a spring 44 which is compressed by a nut 45 on bolt 43 to normally retain the band 42 in braked position on brake drum 40 and an actuating lever 46 pivotally connected to the upper portion of housing 41 and secured to the brake band 42 and bolt 43 whereby actuation of the lever 46 will force the band 42 away from the brake 40 against the tension of spring 44.

The shaft 39 has fast thereto drums 48 and 48' at its outer portions to which cables 37 are attached by means of eye attachments 49 and 49' to be wound or unwound thereon depending upon the clockwise or counterclockwise rotation of the shaft. In order to return the implement 30 to loading position after being tilted a spring 50 is helically wound about the shaft 39 and secured at one end to the eye 49' of the drum 48' and the opposite end to the adjacent side wall of the housing 41 in any suitable manner. In this way rotation of the shaft and drums in a clockwise direction, as in tilting or discharging position, will wind up the spring or place same under tension. When the load has been discharged and assuming the brake band is not applied, the spring 50 will unwind and being connected to the eye 49' of pulley 48' will rotate the shaft counterclockwise to return the implement to loading position and wind the cables 37 onto drums 48 and 48'.

The housing 41 referred to comprises side walls and a rear wall, the side walls having alined apertures to loosely receive the shaft 39, the rear wall of housing being rigidly bolted to the cross member 16' of the carriage by a bolt 51 which in addition to rigidly securing the housing also secures the lower portion of brake band 42 to the rear wall of the casing and to member 16'. The actuating lever 46 is secured to the upper portion of the brake band by the same bolt 43 which carries the spring 44 to normally retain the band in braked position. A projecting part of the lever 46 is provided with an eye 52 to which is connected a cable 53 which extends a suitable distance whereby it is accessible to the operator for actuating the lever 46.

The carriage 16 and 16' is provided with rollers 24 and 25 suitably connected to the carriage 16 by means of nuts and bolts 26 and 27 and forming a secondary and primary pivotal connection for the carriage with respect to the frame. These rollers may be of any type desired and may have ball bearings connected thereto, the main consideration being the longitudinal movement of carriage 16 with the least possible friction. In loading position, the rollers 24 are positioned in the curved upright tracks 15 at the lower curved portions 17 in order that the initial forward movement of the carriage 16 will start elevation of the forward end of the carriage and its implement. The other rollers 25 are disposed in tracks 8.

By providing the rollers 24 at the lower origin points of the lifting tracks 15, the implement is raised higher than the lifting tracks 15 which permits the use of shorter tracks with less liability of their being caught in telephone wires or causing the machine to be top heavy.

The mechanism for operating and controlling the carriage comprises a drive shaft 54 suitably adapted by means of a clutch for connection with the usual power take-off shaft of the tractor and carrying at its forward end a gear 55, and a transverse shaft 56 carrying a gear 57 in mesh with gear 55. The drive shaft is mounted on the right hand side member 1 by means of an upstanding bracket 58 which envelops the shaft and is bolted to right hand side member 1. The drive shaft may be mounted on the left side member 1 if desired, the only consideration being that by mounting it on either of the side members, the space between the members is left unencumbered for the reception of the tractor body in this space.

The drive shaft 54 is provided near its rear portion with an affixed clutch member 59 which is cooperable with a shiftable clutch member 60 slidable on the shaft 54, each of the clutch members having a sleeve, a flange 61 and a spring 62 carried by the clutch members between the flanges 61 to normally hold the members disengaged. The sleeve of the shiftable clutch member 60 extends rearwardly, as shown at 60' in Figure 2, beyond the drive shaft 54 and normally freely rotates on this shaft. Power is transmitted to the sleeve portion 60' in any suitable manner.

A split shiftable collar 63 having depending portions 64 and upstanding portions 65 is operatively carried by the shiftable clutch member 60 and abuts the flange 61 of this member. This collar 63 is pivotally secured by its depending portions 64 to a rigid arm 66 carried by the lower portion of bracket 58, the depending parts 64 being pivotally secured on said arm by any suitable connection. The upstanding portions 65 of the collar 63 are pivoted to link 68 which in turn is pivoted to a lever 67 fulcrumed on the upper portion of bracket 58. When the brake lever 67 is pushed forwardly, the collar 63 is advanced against the flange 61 of slidable clutch member 60 and engages it with stationary clutch member 59 to connect shaft 54 with the power shaft of the tractor.

The transverse shaft 56 which is driven by the drive shaft 54 through the gears 55 and 57 is journaled to the side members 1 by bearings 69 and fixedly carries at its outer portions drums 70 on which are wound cables 71, the outer ends of the cables being connected to the carriage beams 16. Driving of the transverse shaft 56 winds the cables 71 on the drums 70 and causes the operation of the carriage 16 to raise the implement.

Figure 7:
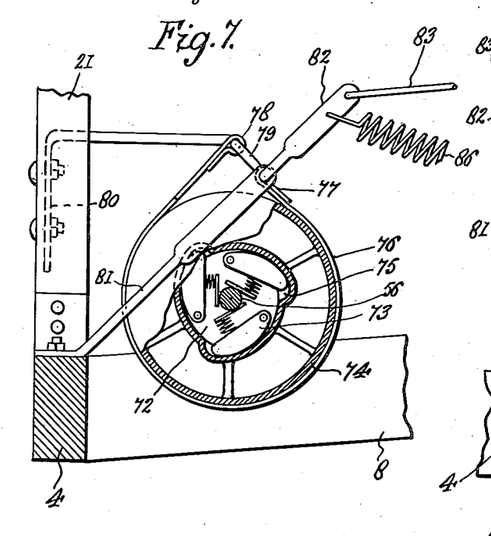
Figure 7 is a front elevational view with parts broken away of the brake mechanism for holding the carriage and implement elevated.
Figure 8:
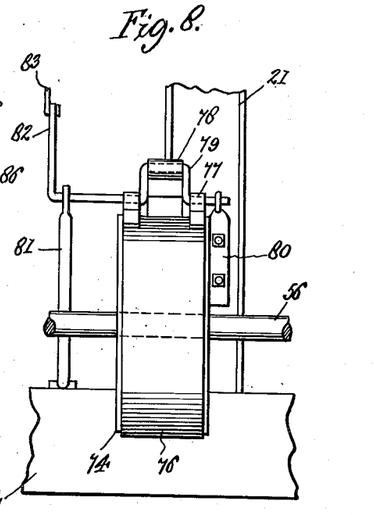
Figure 8 is an end elevational view as seen from the right of the parts shown in Figure 7.

Mechanism is carried by the transverse shaft 56 to permit the implement being held in any raised position and includes means whereby the carriage is returned to its normal or loading position by gravity. This mechanism is shown in detail in Figures 7 and 8 of the drawings and comprises a hub 72 fast to the shaft 56 and rotating therewith, spring pressed dogs 73 pivotally secured to the hub, a brake drum 74 having ratchet shoulders 75 for the dogs 73 and a brake band 76 for the brake drum 74. The brake drum 74 is freely mounted on the hub 73 whereby a clockwise movement of the hub and shaft and dogs is permitted with the drum remaining stationary but a counter clockwise movement of the same members connects the drum to the hub and shaft by means of the spring pressed dogs and ratchet shoulders. The brake band 76 by frictional engagement with the drum 74 controls the rotation of the shaft 56 when this shaft is moved counter clockwise.

Figure 1:
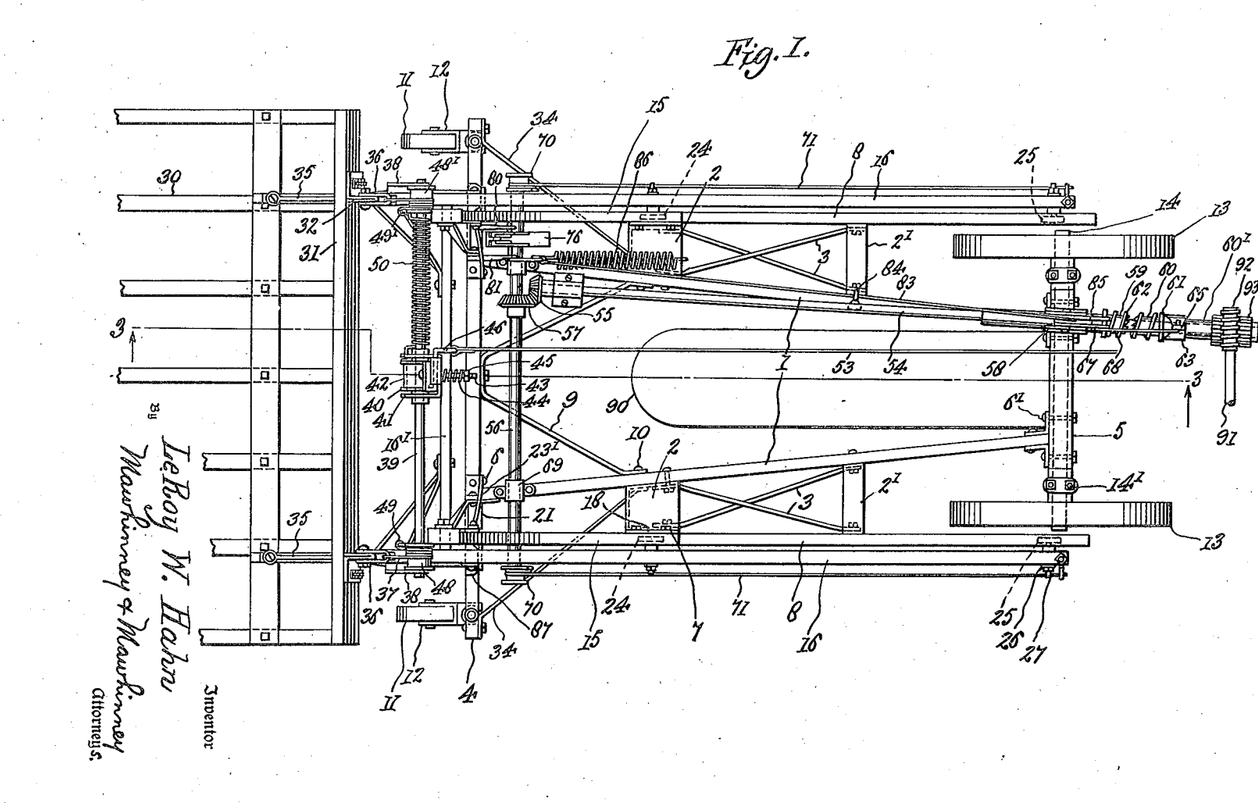
Figure 1 is a top plan view of an improved loader constructed in accordance with the present invention.

The brake band 76 is provided at one end thereof with spaced lug members 77 and on the other end with a central lug member 78 for connection to a crank pin 79 which is rotatably carried at one end by a bracket 80 bolted to channel beam 21 and at the other end by a bracket 81 bolted to cross member 16'. The lug 78 of brake band 76 is carried by the crank portion of the pin 79 while the spaced lug members 77 are carried by the straight portions of the pin 79 substantially in abutment with the crank arms thereof. One end of the straight portions of member 79 is bent at right angles to provide an upstanding lever arm 82 having two apertures at its uppermost portion, one of the apertures having connected thereto one end of a brake rod 83 which is centrally supported by a bracket 84 upstanding from the right side member 1 and through which the rod 83 freely slides. The other end of the brake rod 83 is connected to a pivotal brake lever 85 similar to and in alinement with brake lever 67 and carried by the same bracket 58. As shown in Figure 1, the brake lever 85 has been thrown to a lowered position to frictionally apply brake band 76 to brake drum 74.

A spring 86 is connected at one end thereof to the lever arm 82 and at the other end to the horizontal bar 2 for the purpose of aiding return of the brake band 76 and to retain the brake lever 85 in either engaged or disengaged position. When the brake band is to be released from contact with the brake drum 74 the lever 85 is urged forwardly against the tension of spring 86 which acts to move the crank portion of pin 79 forwardly and carry with it that portion of the brake band 76 connected to it and normally in contact with the brake drum 74. When the brake lever 85 has been pushed forwardly past the dead center, the spring 86 will tend to hold it in released position. The same action takes place when the lever 85 is pulled backward to frictionally engage and retain the brake band 76 on brake drum 74. In the latter instance the action takes place against the compression of the spring 86 to not only force the band into contact with the drum but the spring compression also holds the lever in applied position when it has been pulled past the dead center. When the lever 85 is in upright position or between the dead centers the band 76 does not bind on the drum 74 to any great extent, it being necessary to operate the lever 85 to one of its dead center positions to engage or disengage the brake band.

A similar action takes place on the lever 67 of the clutch member 60 by means of the spring 62. When the lever 67 is pushed forwardly against the tension of spring 62 and past the dead center, the spring 62 retains it in this position. The reverse is of course true when the lever 67 is pulled back to disengage the clutch member 60 from clutch member 59.

In order to protect the cross member 14 from the direct impact of the carriage 16 when it is lowered to loading position, the member 4 has bolted on its upper end portions rests 87. These rests also prevent the carriage 16 from coming into contact with the drums 70 of the transverse shaft 56.

Figures 2, 11:
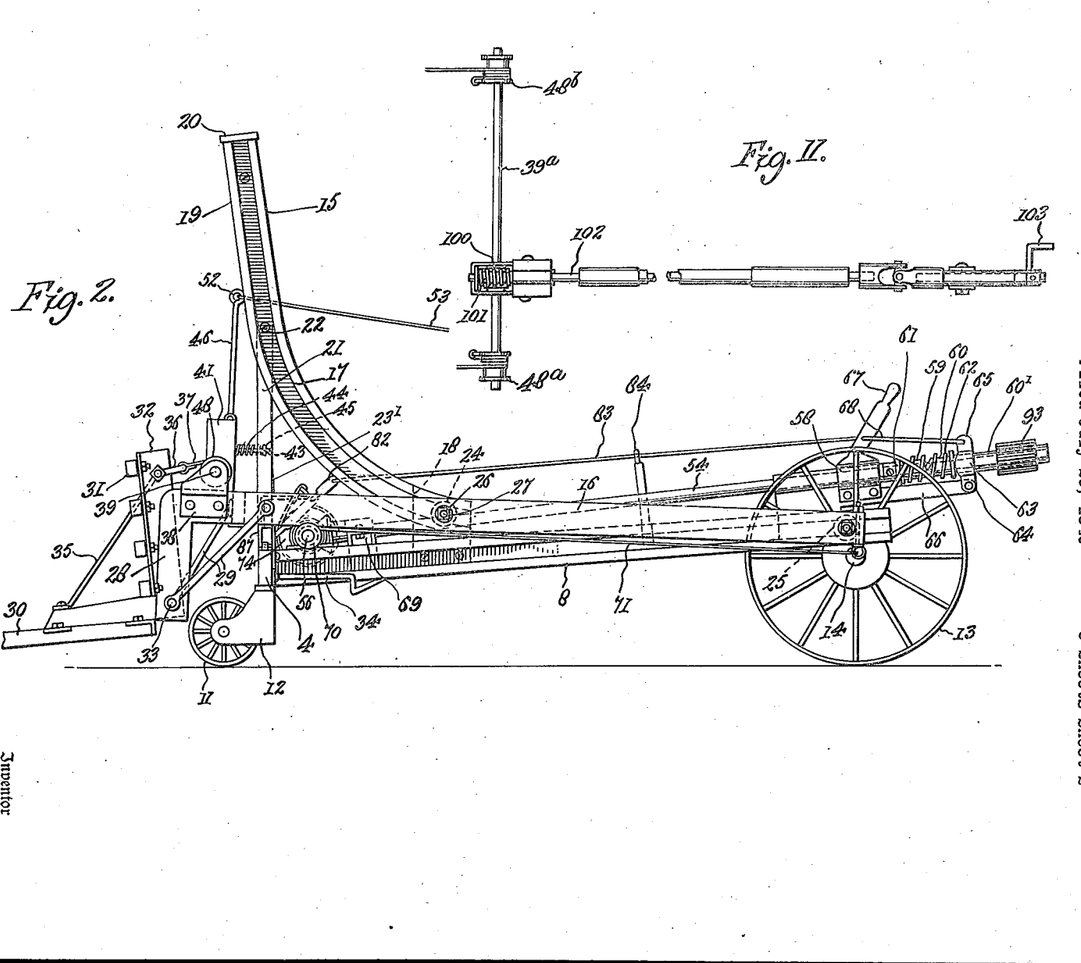
Figure 2 is a side elevation of the same.
Figure 11 is a fragmentary plan view showing a modified form of tripping or discharging device for raising and lowering the fork.
Figure 3:
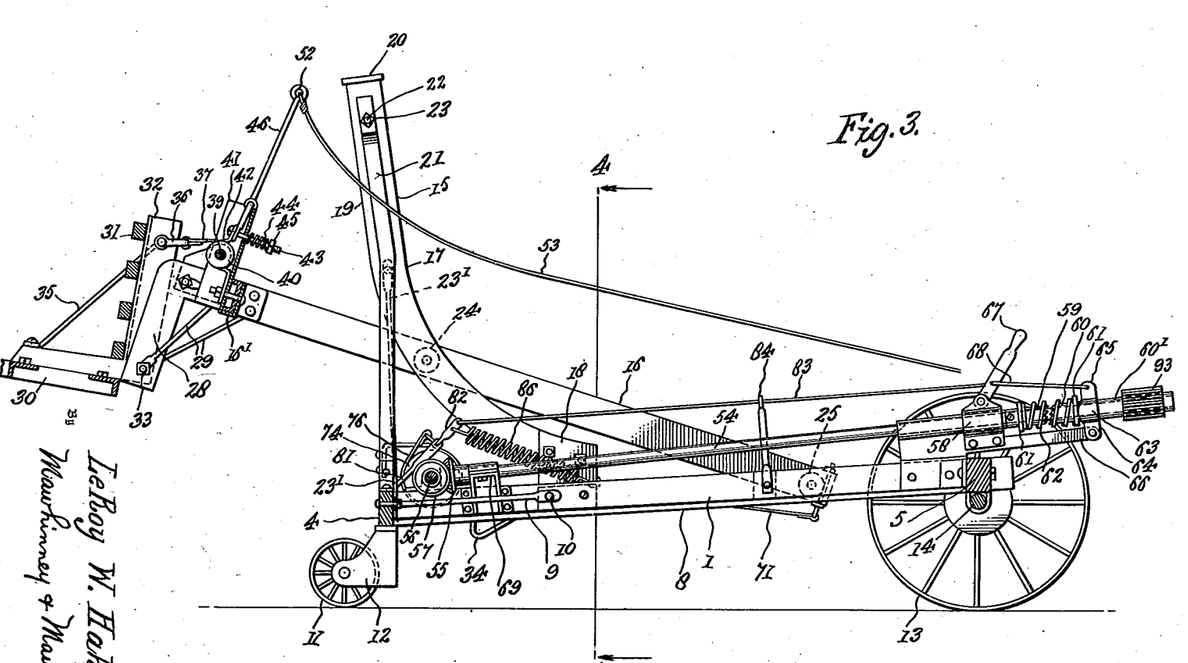
Figure 3 is a longitudinal sectional view taken along lines 3—3 of Figure 1.
Figures 4, 9, 10:
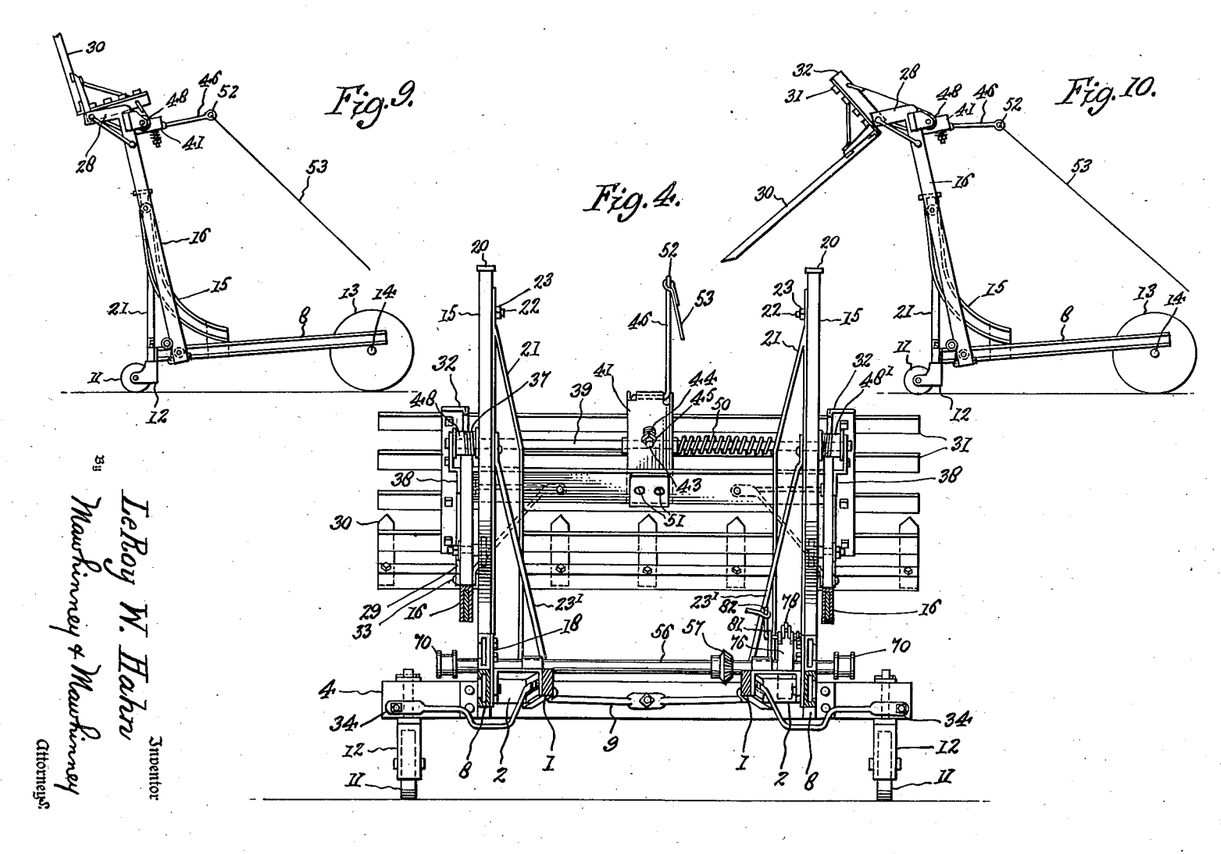
Figure 4 is a transverse sectional view taken along lines 4—4 of Figure 3.
Figure 9 is a diagrammatic view from one side indicating the uppermost position of the carriage and implement.
Figure 10 is a similar view with the implement shown as discharging.

In operation, with the parts in position as shown in Figure 2, power is applied to the sleeve portion 60' of the shiftable clutch member in any suitable manner from the power shaft of a tractor or other device. This may be done in many ways, such as securing pulleys on the sleeve portion 60' and similar pulleys on the power shaft of the tractor with belts over these pulleys to transmit the power from one shaft to the other. With the power applied, the clutch member 60 will rotate freely on shaft 54 as the clutch member 60 is held in disengaged position with stationary clutch member 59 by the intervening spring 62. The clutch lever 67 is then pushed forward which will carry with it the collar 63 and the shiftable clutch member 60 into engagement with the stationary clutch member 59 which is fast on shaft 54. After the lever 67 is pushed past the dead center the spring 62 will aid in keeping the lever down and the members in engaged position.

In this position the shaft 54 will be driven and through the gears 57 and 59 the transverse shaft 56 will also be driven in a counter-clockwise direction. This rotation of shaft 56 will wind up the cables 71 on drums 70 and as the other ends of the cables are attached to the carriage 16, the carriage will be carried forward in tracks 8 by means of rollers 25 and in the curved upright tracks 15 by rollers 24 to elevate the implement 30.

It will be noted that the lower curved portions 17 of the lifting tracks 15 are the locations occupied by rollers 24 when the carriage 16 is in the position shown in Figure 2 and the initial forward movement of the carriage immediately starts to raise the carriage and implement. This permits the implement to be raised to a height greater than the members 15 and does away with tall projecting uprights which frequently catch in telephone wires or render the machine top heavy.

During the lifting movement described, the brake carried by shaft 56 has been inoperative, the hub 72 and dogs 73 rotating with the shaft 56 within the drum 74 which is held stationary by a slight frictional engagement of the band 76. A counterclockwise movement of parts 72 and 73 within drum 74 is permitted by the spring pivoted dogs being depressed on passing the ratchets 75 while the drum 74 is held stationary.

When it is desired to retain the carriage at any desired height, the brake lever 85 is pulled backward to the position shown in Figure 1, past its dead center to be retained in applied position. This frictionally engages the brake band 76 on drum 74 to retain it against any movement. The clutch lever 67 is simultaneously pulled rearwardly to disengage the clutch members 59 and 60, aided by the spring 62 expanding on the rearward movement of the lever 67. This frees the transmission or drive shaft 54 and transverse shaft 56 from the power of the tractor and ordinarily the implement 30 and its carriage 16 would gravitate to a lowered position. However in this case the clockwise movement of the transverse shaft 56 is resisted by the dogs 73 entering the ratchets 75 of the drum 74 to establish a connection between these elements and tending to rotate them together clockwise. Clockwise rotation of the brake drum 74 and consequently of transverse shaft 56 is thus controlled by brake lever 85 which frictionally engages the drum 74 to retain same against movement when desired. The transverse shaft 56 carrying the cables 71 which pull the carriage 16 and implement 30 is thus braked and the carriage and implement held at the desired height.

If a lower height is desired, the brake lever 67 is actuated to release the brake band 76 from drum 74 to permit clockwise rotation of shaft 56 and the unwinding of the cables 71 and permit the carriage to be lowered by gravity until the brake band is again applied by brake lever 67.

When the carriage 16 is to be returned to its initial normal or lowered position, the brake lever 85 is actuated to release the band 76 from contact from the drum 74. As pointed out above, this releases the transverse shaft 56 to permit its clockwise rotation. In turn this permits unwinding of the cables 71 from drums 70 by the rearward movement of the carriage 16. The implement 30 being fairly heavy will aid in the backward movement of the carriage under control of the brake lever 85.

While the implement 30 is being raised the tripping mechanism is in the position shown in Figure 2, the brake band 42 being frictionally engaged with the brake 40 by the expansion of spring 44 to prevent rotation of shaft 39, drums 48 and 48' and unwinding of cables 37 and retain the implement in non-tilted position as shown.

When the load is to be discharged from the implement 30, the cable 53, which is within easy reach of the operator, is pulled backwardly and this action forces the brake band 42 away from contact with brake 40 and placing the spring 44 under tension. Release of the brake 40 from band 42 permits the implement 30 aided by its load to pivotally tilt at the point 38 to discharge its contents.

When the implement 30 pivots forwardly, the back portion 31 assumes a horizontal position and having one end of the cables 37 attached thereto, unwinds these cables by rotating the drums 48 and 48' to which the other ends of the cables 37 are attached by eyes 49 and 49'. The drums 48 and 48' are fast to shaft 39, the drum 48' having connected thereto by means of the eye attachment 49' one end of a spring 50 which envelops the shaft 39 and connected at its other end to the adjacent side member of housing 41. As the cables 37 unwind they rotate the drums with their eye attachments and consequently the spring 50 being connected to eye 49' is wound up or placed under tension.

After the load has been discharged and with the brake band 42 still out of contact with brake drum 40, the implement being lighter is brought to its loading position by the unwinding of spring 50 which rotates the shaft 39 clockwise due to its connection at 49' to pulley 48' which is fast to shaft 39. Rotation of the shaft 39 clockwise winds up the cables 37 on drums 48 and 48' and in so doing pulls the back portion 31 to a vertical position, the guides 32 of back 31 fitting into the guide member 28. When the parts are in this position the cable 53 is released, the brake band 42 engaging the brake 40 by the expansion of spring 44.

Thus it will be noted that implement 30 may be left tilted at any angle by releasing the cable 53 to apply the brake band 42 to brake 40 or the implement may be held at a desired height by disengaging the clutch members 59 and 60 and applying the brake band 76 to brake drum 74.

The cables are attached to the rear ends of the carriage arms which are favorable points for the application of power, being remote from the secondary or intermediate fulcrums 24 about which the arms both move forward and lever upward. Thus the power exerts a pushing force in substantial alinement with both the horizontal rails and the curved elevating rails. The rear or end rollers 25 constitute traveling fulcrum points for the carriage arms guiding the ends of the arms back and forth in rectilinear movement and at the same time allowing the arms to rotate. When the rollers 24 ascend to the upper limits of the curved track rails the carriage arms are upended rising to a considerable height above the relatively low curved track rails and raising the implement to a desirable high elevation. Thus the carriage has both a forward and backward longitudinal movement accompanied by a strong levering elevating and lowering movement. The tractor 90 is equipped with the power take-off shaft 91, which may have a worm 92 fast thereon disposed in mesh with a worm wheel 93 fast on the sleeve 60'.

Referring more particularly to Figure 11, 39$^a$ indicates the tripping shaft with the drums 48$^a$ and 48$^b$. In this form of the invention, instead of employing the friction brake mechanism to release and trip the load, I employ a worm wheel 100 affixed to shaft 39$^a$ and disposed in mesh with a worm 101 on a long telescoping shaft 102. This shaft extends back to the tractor seat where it is provided with a crank handle 103 suitably arranged to be operated by the operator of the tractor occupying the tractor seat. Thus this mechanism forms the tripping device in place of the friction brake. It is operated by hand in both directions and takes the place of the shaft 39, spring 50 and the friction brake mechanism. Either way of tripping or discharging the load on the fork may be used.

While I have shown a cross member 5 to which the side members 1 are attached, this cross member is also representative of the rear axle housing of a tractor to which the members 1 may be secured by the use of the same clamp bolts as illustrated. Thus initially there is no cross member between the members 1, leaving this space free for driving the tractor in and out for attaching or detaching the loader.

Instead of using the worm transmission 92, 93, the transmission of power from the take-off shaft of the tractor to shaft 54 may be done in any way the manufacturer sees fit, with V-belts or chains or in any other like manner.

It is obvious that various changes and modifications may be made in the details of construction and design of the above specifically described embodiment of this invention without departing from the spirit thereof, such changes and modifications being restricted only by the scope of the following claims.

What is claimed is:

1. In a loader, a carriage, an implement movably supported on the carriage, a shaft on the carriage, connections between said shaft and implement, a brake drum fast on the shaft, a brake band biased to tight frictional engagement with said drum, and control means in prying relation to said band to ease its frictional resistance off said drum.

2. In a loader, an implement, a carriage for supporting the implement for bodily lifting movement and independent dumping movement relative to the carriage, a wheeled frame movably supporting the carriage and implement for movement of the implement into load-receiving relation to load material and subsequently backing away from such material, means to raise a portion of the carriage and said loaded implement when the carriage is moved in one direction relatively to said frame, power means to move the carriage relatively to said frame in said direction, releasable brake means to hold the loaded implement against dumping movement, and return means for the implement for automatically restoring the implement after dumping to initial load-receiving and supporting position.

3. In a loader, a carriage, an implement supported movably on the carriage, a shaft on the carriage, connections between said shaft and implement to cause movement of the two simultaneously, spring means wound on said shaft and adopted to have potential energy stored therein by the rotation of the shaft in one direction incident to the dumping movement of the implement under load, the energy in said means adapted to become kinetic on discharge of the load to restore the shaft in the opposite directional rotation to raise the implement to load supporting position, and means carried by the shaft for controlling the movement of said implement under the influence of said spring means.

4. In a loader, a carriage, an implement movably mounted on the carriage, a shaft journaled on the carriage, flexible connections between said shaft and implement, a coil spring wound about the shaft and having one end affixed to the shaft and the other end anchored to a fixed part of the carriage, a brake drum fast on the shaft, a brake band biased to tight frictional engagement with said drum and control means in prying relation to said band to ease its frictional resistance off said drum.

5. In a loader, a frame, an implement, adapted to receive a load, a carriage pivotally carrying said implement for dumping movement, said carriage movably mounted on said frame, means to raise a portion of the carriage and implement when the carriage is moved in one direction relatively to said frame, power means to move the carriage relatively to said frame in said direction, brake means to hold the loaded implement against dumping movement, and return means for the implement for automatically restoring the implement after dumping to initial load-receiving and supporting position.

6. In a loader, a frame, a carriage movable relatively to the frame and supported thereby, an implement carried upon an outer end portion of said carriage, pivot means at the other end portion of said carriage slidably associated with said frame to permit longitudinal and simultaneous swinging movement of said carriage with respect to the frame, curved lifting tracks carried by said frame, secondary pivot means carried by an intermediate portion of said carriage and engaged with said curved lifting tracks, and means connected to said carriage for moving the same longitudinally of the frame and causing said secondary pivot means to climb said curved lifting tracks.

7. In a loader, a frame, a carriage movable relatively to the frame, an implement carried by one end portion of the carriage, pivot means pivotally connecting the other end portion of the carriage to said frame, said pivot means being slidable with respect to said frame, lifting tracks on the frame, secondary pivot means on an intermediate portion of the carriage engaged and movable in said tracks, said tracks and secondary pivots means being so related to one another in the locked position of the carriage as to initiate upward swinging movement of said carriage upon commencement of the relative movement of the carriage with respect to the frame, and power transmission means carried by said frame and in operative connection with said carriage at the end portion thereof carrying said first-mentioned pivot means for exerting a pushing action of the secondary pivot means upon said lifting tracks.

8. In a loader, a frame, a carriage movable relatively to the frame, an implement carried by one end portion of the carriage, pivot means pivotally connecting the other end portion of the carriage to said frame, said pivot means being slidable with respect to said frame, lifting tracks on the frame, secondary pivot means on an intermediate part of the carriage engaged and movable in said tracks, said tracks and secondary pivot means being so related to one another in the lowered position of the carriage as to initiate upward swinging movement of said carriage upon commencement of the relative movement of the carriage with respect to the frame.

9. In a loader, a frame, an implement, a carriage carrying said implement and movable relatively to said frame, power means connected to an end portion of said carriage for moving the carriage relatively to said frame, pivotal means connecting said carriage with the frame and the said end portion of the carriage, lifting tracks on the frame, and pivotal means at an intermediate part of said carriage engaged with said lifting tracks to cause levering movement of said carriage about the first-named pivotal means and the elevation of said implement by the combined elevating movement of said lifting tracks and a leverage movement of said carriage.

10. In a loader, a frame, a carriage movably mounted on said frame, an implement movably supported on the carriage, means for causing movement of said carriage in one direction relatively to said frame, lifting means on the frame engaged by said carriage to cause elevation of the implement when the carriage is moved in said direction, and spring means constructed and arranged to be wound by the implement in the act of dumping and automatically raising the implement to load supporting position, the load of the spring being less than the load of the implement to cause the implement when loaded to automatically dump to discharge position simultaneously winding said spring means to a potential condition which becomes kinetic on a discharge of the load to raise the implement to load supporting position.

11. In a loader, a frame, a carriage movably mounted on said frame, an implement supported movably on the carriage, a shaft on the carriage, connections between said shaft and implement to cause movement of the two simultaneously, means connected to said shaft and adapted to have potential energy stored therein by the rotation of the shaft in one direction incident to the dumping movement of the implement under load, the energy in said means adapted to become kinetic on discharge of the load to restore the load in the opposite directional rotation to release the implement to load supporting position, means for causing movement of said carriage in one direction relatively to said frame, and lifting means on the frame engaged by said carriage to cause elevation of the implement when the carriage is moved in the said direction.

12. In a loader, a frame, an implement, a carriage pivotally carrying said implement and movably mounted on said frame, means for causing movement of said carriage in one direction relatively to said frame, lifting means on the frame engaged by said carriage to cause elevation of the implement when the carriage is moved in said direction upon initial movement of the carriage, a shaft journaled on the carriage, flexible connections between said shaft and said implement, and a coil spring wound about the shaft and having one end affixed to the shaft and the other end anchored to a fixed part of the carriage.

LE ROY W. HAHN.